United States Patent [19]

Brace

[11] Patent Number: 4,696,148

[45] Date of Patent: Sep. 29, 1987

[54] HYDRAULIC POWER TRANSMISSION SYSTEM

[76] Inventor: R. Lyle Brace, P.O. Box 2785, Gulfport, Miss. 39505

[21] Appl. No.: 692,714

[22] Filed: Jan. 18, 1985

[51] Int. Cl.$^4$ ............................................. F16D 39/00
[52] U.S. Cl. ...................................................... 60/489
[58] Field of Search ................................. 60/487, 489

[56] References Cited

U.S. PATENT DOCUMENTS

| | | | |
|---|---|---|---|
| 2,589,362 | 3/1952 | Foster | 60/489 |
| 4,109,466 | 8/1978 | Keech | 60/487 |

FOREIGN PATENT DOCUMENTS

| | | | |
|---|---|---|---|
| 421330 | 11/1945 | Italy | 60/487 |
| 221749 | 9/1924 | United Kingdom | 60/487 |

*Primary Examiner*—Edward K. Look
*Attorney, Agent, or Firm*—Quaintance, Murphy & Presta

[57] ABSTRACT

A fluid continuously variable transmission system that includes a body forming a cylindrical chamber. A rotor with blades positioned in the chamber is connected to a power input shaft. The rotor is rotatably movable relative to the body, which in turn is connected to a power output shaft. A valve, preferably a rotary plug valve, is connected to the rim portion of the body. The valve is movable between fully open and fully closed positions, and a plurality of intermediate positions therebetween. The body forms a fluid circuit between a high pressure channel from the chamber to the valve and a low pressure channel from the valve to the chamber. The rotor pressurizes fluid in the fluid circuit against the valve in proportion to the degree of closing of the valve which action rotates the body in all valve positions except the fully closed position. The speed of rotation of the output shaft relative to the input shaft is directly related to the degree of closing or opening of the valve and thus the speed of the output shaft is controllably variable over a plurality of valve positions.

7 Claims, 13 Drawing Figures

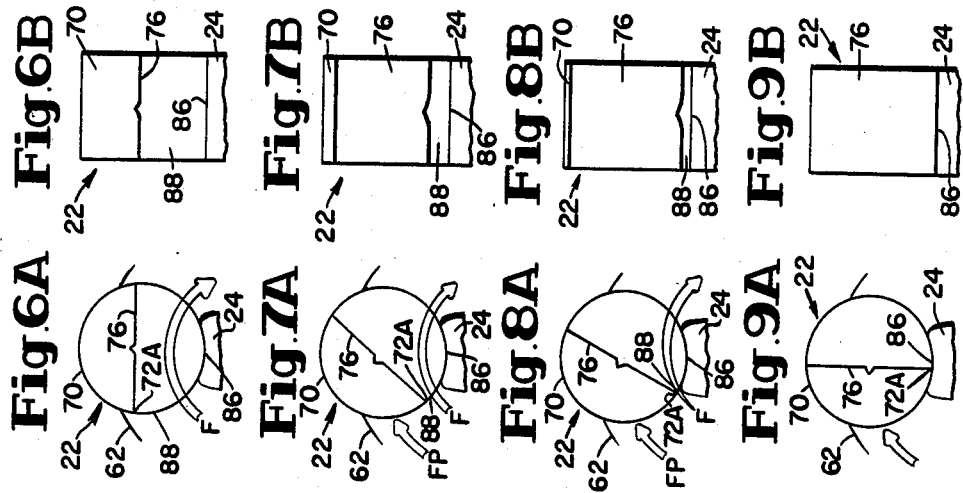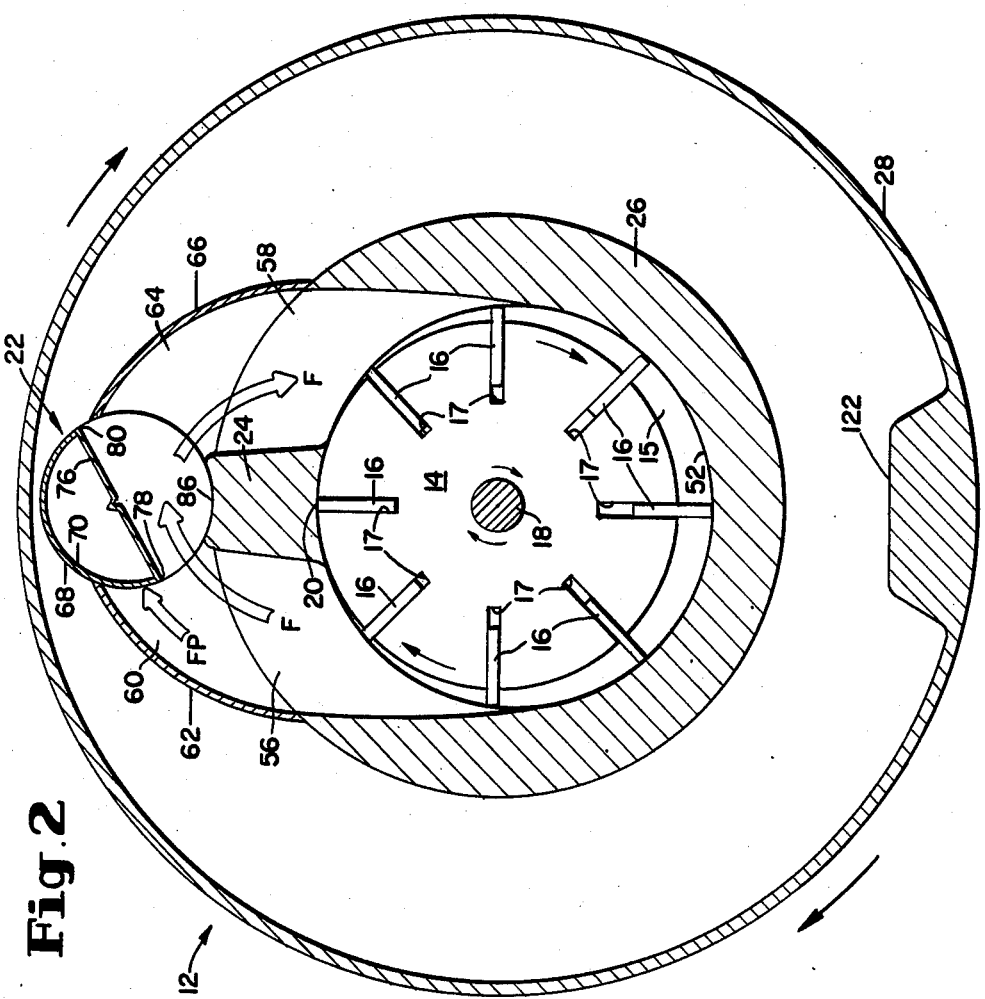

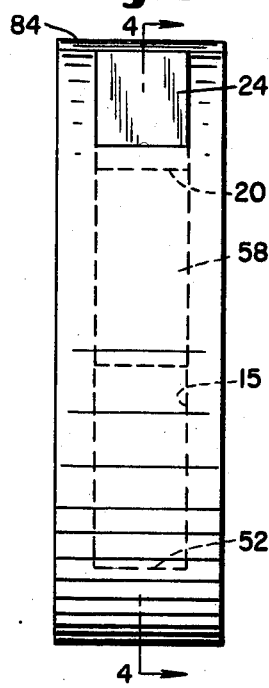
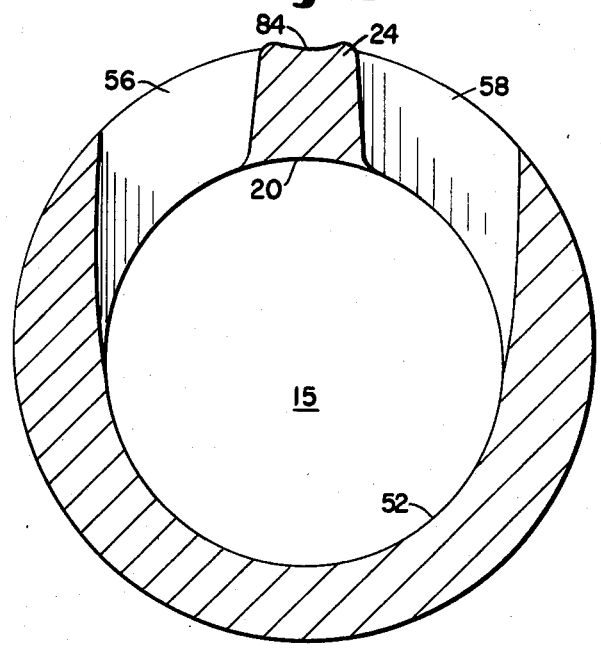
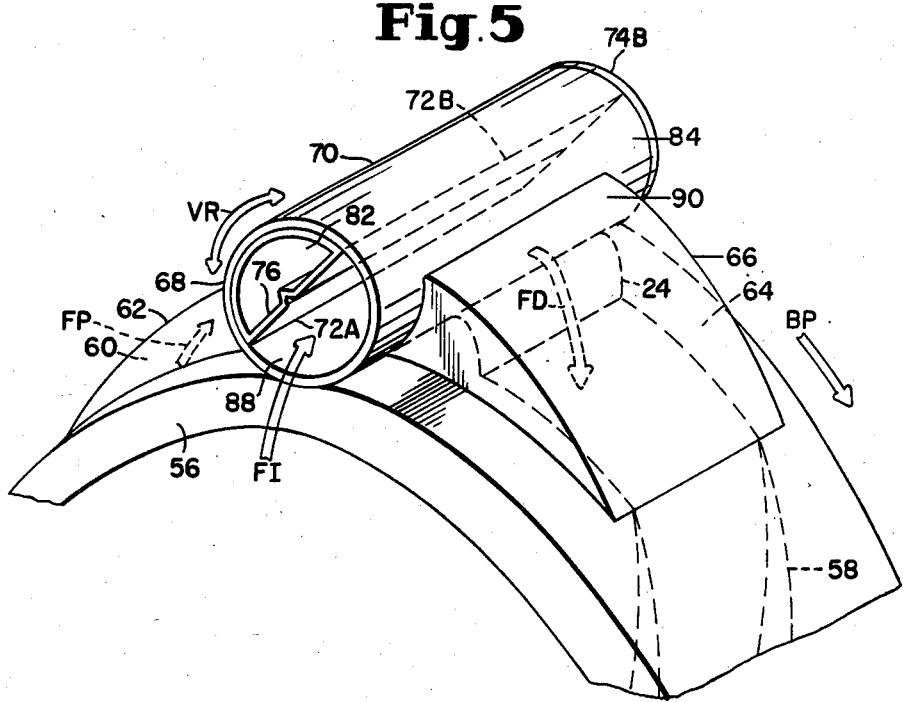

HYDRAULIC POWER TRANSMISSION SYSTEM

BACKGROUND OF THE INVENTION

This invention relates to power transmission systems and more particularly to a continuously variable transmission (CVT) of the hydraulic type.

A CVT system allows an engine to operate at its optimal fuel consumption point. The standard transmission is capable of a predetermined number of gear ratios as the torque demand for the vehicle is high or low, generally three or four gear ratios in automatic transmissions up to five in manual transmissions. A CVT system, on the other hand, transfers power in a continuously changeable power ratio between the high and low torque demands. The speed ratio in a CVT can be varied in exact accordance with torque demand rather than varied approximately as in standard transmission systems.

Interest is increasing in the efficiency of operation of motor vehicles. The long history of CVT research, however, has not provided a fully practical transmission for motor vehicles except for certain compact and subcompact cars and for small vehicles, such as snowmobiles and lawnmowers. The CVT provides better fuel economy, is lighter and has a lower manufacturing cost than the standard three-speed automobile transmission. The reason for the latter advantage is that the CVT has about a third fewer parts than the standard transmission.

CVT systems can be classified as belt and pulley, traction drive, and fluid or hydraulic power. The hydraulic power CVT generally uses a pump as a part of the system. This latter type of CVT is used in certain types of off-road vehicles but, because of high cost, weight, limited range of efficiency, and noisy operation, it is not used for common motor vehicles.

Most CVT systems, including the hydraulic CVT, are adapted for use with the internal combustion engine, that is, with a power shaft that varies in rotational speed. They are not generally adapted for use with constant speed power shafts, such as those driven by electric motors.

SUMMARY OF THE INVENTION

Accordingly, it is a principal object of the present invention to provide a hydraulic CVT system that operates with a rotor with blades that transmit power via a fluid contained in a closed assembly that rotates about the rotor.

It is another object of the present invention to provide a hydraulic CVT system that responds to continuously changing torque by a varying fluid flow that is inversely proportional to the torque demand.

It is another object of the present invention to provide a hydraulic CVT system that includes a power shaft that transmits power via a rotor and valve fluid circuit that can be adjusted to pass a selected amount of fluid so that uncirculated fluid acts to pressure the system at the valve into a rotational movement about the power shaft at a speed proportional to the pressure exerted by the unpassed fluid.

It is another object of the present invention to provide a hydraulic CVT system that can operate with either a variable speed or a constant speed power input.

It is yet another object of the present invention to provide a hydraulic CVT system that can be varied in speed and torque output while the system is in operation.

In accordance with the above objects, there is provided a fluid, continuously variable transmission system that includes a body forming a chamber, a rotor with blades positioned in the chamber and rotatably movable relative to the body, a power input shaft connected to the rotor means, and a valve connected to the body and movable between fully opened and fully closed positions and a plurality of intermediate positions therebetween. The body forms a high pressure channel between the chamber and the valve and also forms a lower pressure channel between the valve and the chamber. The chamber, the high pressure channel, and the low pressure channel are filled with a suitable hydraulic fluid capable of exerting fluid pressure against the valve.

The valve is constructed to pass the fluid to create a closed fluid circuit with the chamber and the high and low pressure channels. The rotor is capable of pressuring the fluid from the chamber to the valve wherein when the valve is in its fully closed position, the fluid pressures the valve with the body to rotate with the rotational speed of the input shaft. When the valve is in its fully open position, the fluid passes through the valve to the chamber and the body is immobile relative to the input shaft and the rotor. When the valve is in any of the intermediate positions, a first fluid portion of the fluid pressures against the valve and a second fluid portion of the fluid passes through the valve to the chamber. The relations between the first and second fluid portions is proportional to the degree of closing the valve.

The system also includes a power input shaft and a structure that connects the body to the output shaft. The body is supported at the input shaft and the output shaft. A control mechanism is connected to the body for adjusting the valve between its open and closed positions in accordance with torque requirements of the output shaft, wherein the speed of the output shaft can be varied relative to the speed of the input shaft in a plurality of ratios between a ratio of one-to-one and a ratio of one and a preselected multiple of one, respectively.

The valve is preferably a rotary plug valve rotatably attached to the body and including a valve seat likewise secured to the body.

The input shaft can be driven at variable speed or driven at constant speed.

A pressure relief system connected to the high pressure channel and leading to and from a fluid reservoir bleeds off excess fluid when the fluid circuit is pressured beyond its capacity.

In addition, means for regulating the temperature of the fluid and a fluid filter may also be provided.

BRIEF DESCRIPTION OF THE DRAWINGS

The invention will now be described with reference to the accompanying drawings, wherein:

FIG. 2 is a sectional view taken substantially along line 2—2 of FIG. 1;

FIG. 3 is a side view of the side plates taken in rotation;

FIG. 4 is a sectional view taken substantially along line 4—4 of FIG. 3;

FIG. 5 is a perspective view of the rotary plug valve and inlet and outlet channels;

FIG. 6A is a side view of the rotary plug valve in a fully open position;

FIG. 6B is a frontal view of the rotary plug valve shown in FIG. 6A;

FIG. 7A is a side view of the rotary plug valve in an approximately 50 percent closed position;

FIG. 7B is a frontal view of the rotary plug valve shown in FIG. 7A;

FIG. 8A is a side view of the rotary plug valve in an approximately 95 percent closed position;

FIG. 8B is a frontal view of the rotary plug valve shown in FIG. 8A;

FIG. 9A is a side view of the rotary plug valve in a fully closed position; and

FIG. 9B is a frontal view of the rotary plug valve shown in FIG. 9A.

DESCRIPTION OF THE PREFERRED EMBODIMENT

Figure 1:
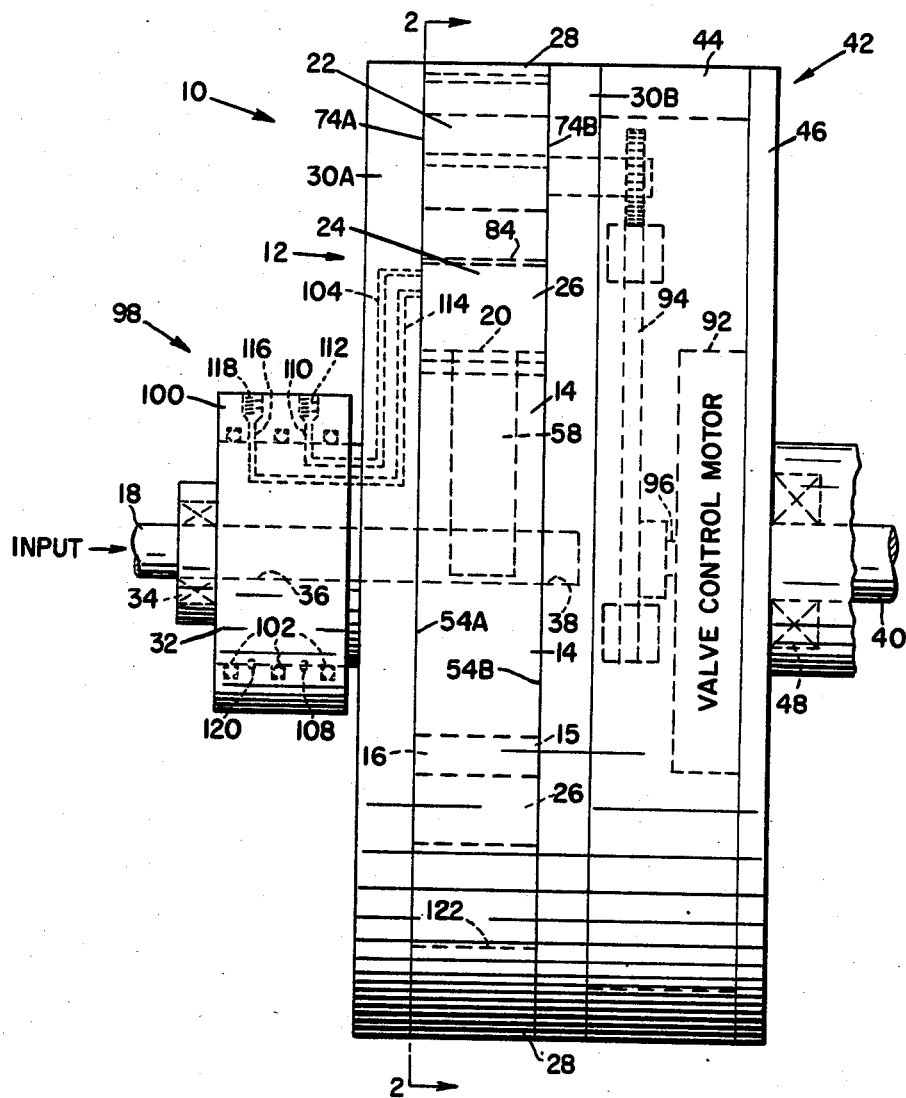
FIG. 1 is a side elevational view of the hydraulic CVT system.

Reference is now made in detail to the drawings.

A fluid continuously variable transmission (CVT) system 10 shown in a side view in FIG. 1 and in a frontal view in FIG. 2 includes a generally cylindrical body generally designated as body 12 and which will be set forth in detail hereinafter, and a cylindrical rotor 14 having radially extending blades 16 rotatably positioned in a generally cylindrical chamber 15 formed at the center of body 12. Rotor 14 is connected by keying or other known methods to a power input shaft 18, which is centered at the axis of rotor 14. The input shaft 18 is connected to a driver (not shown). Rotor 14 with its blades 16 are rotatably driven by input shaft 18. Blades 16 are positioned in slots 17 formed by rotor 14 and each blade is radially movable in and out of slots 17 between a totally withdrawn position relative to the cylindrical periphery of rotor 14 and a fully extended position wherein the blade extends itself beyond the cylindrical periphery of rotor 14 in a manner and an extent to be fully described later.

Body 12 rotatably meets rotor 14 at a line 20 axially parallel with input axle 18 as shown in FIGS. 1 and 2. It is to be understood that line 20 is shown directly vertically above input shaft 18 in FIGS. 1 and 2 only for the purpose of simplifying the present disclosure. Since both rotor 14 and body 12 are rotatable about the same axis of rotation as input shaft 18, line 20 can therefore occur at a plurality of angles. Also, rotor 14 with its blades 16 are rotatably movable relative to the body shaft about the axis of rotation of input shaft 18. The rotational speed of body 12 about input shaft 18 can equal but never exceed the rotational speed of rotor 14.

A rotary plug valve 22, which includes its valve seat 24, is connected to the rim portion of cylindrical body 12. Valve 22 is rotatably connected to body 12 and valve seat 24 is secured to body 12 so that valve 22 is rotatable relative both to valve seat 24 and to body 12.

Body 12 includes a cylindrical inner piece 26, a cylindrical outer ring piece 28 concentrically mounted around inner piece 26, and a pair of opposed generally cylindrical end plates 30A and 30B, which are suitably connected to opposite sides of inner and outer pieces 26 and 28. End plate 30A includes a cylindrical hub 32 which extends outwardly from end plate 30A in a direction towards the driver of input shaft 18. Inner and outer pieces 26 and 28 and end plates 30A and 30B and hub 32 are all aligned on their respective axes with input shaft 18, as is rotor 14. Inner and outer pieces 26 and 28 and end plates 30A and 30B are all suitably connected so as to form a portion of integral body 12 which is supported on one side at input shaft 18 at input shaft bearings 34 mounted at a first bore 36 which extends through the axis of end plate 30A and end portion 32. Input shaft 18 extends through body 12 to a second bore 38 that is formed at the axis of end plate 30B.

A power output shaft 40 axially aligned with input shaft 18 is spaced from body 12. A connecting structure 42 joins body 12 with output shaft 40. Connecting structure 42 includes a cylindrical sleeve 44 that extends from one of its circular peripheries from the periphery of body 12 to a cylindrical mounting plate 46 connected to the other of its circular peripheries. Mounting plate 46 is axially mounted to output shaft 40 at output shaft bearings 42. Body 12 is rotatably supported on input shaft bearings 34 and output shaft bearings 48.

Central cylindrical chamber 15 formed by body 12 is adapted to rotatably contain rotor 14 and its blades 16. As noted previously, rotor 14 is axially secured to input shaft 18. Chamber 15 is slightly offset relative to rotor 14 and input shaft 18. The radial direction of valve 22 at this offset is known in the art of centrifugal or rotary pumps. Blades 16, as described previously, are radially movable in slots 17 so that as rotor 14 turns, each blade 16 is moved increasingly radially outwardly by centrifugal force to the full extension of each blade so as to sweep the outer cylindrical surface 52 of chamber 15. As each blade 16 rotates towards meeting line 20 between rotor 14 and surface 52, it is pressed increasingly radially inwardly by surface 52 until it reaches its fully withdrawn position at the periphery of rotor 14.

Chamber 15 is formed at its periphery, or cylindrical surface 52, by inner piece 26 and at its sides by the inner walls 54A and 54B of end plates 30A and 30B, respectively. Chamber 15 is formed by inner piece 26 so as to have a discharge port 56 and a suction port 58 formed by inner piece 26 on opposite sides of valve seat 24 and of meeting line 20.

A high pressure channel 60 coextensive with discharge port 56 at one end is formed from a high pressure conduit member 62 that is connected to inner piece 26 around the periphery of discharge port 56. A low pressure channel 64 coextensive with suction port 58 at one end is formed from a low pressure conduit member 66 that is connected to inner piece 26 around the periphery of suction port 58. High and low pressure conduit members 62 and 66 are part of body 12 of system 10.

As seen best in FIG. 5, which is a perspective view of the sides of system 10 with end plate 30A removed, rotary plug valve 22 includes a cylindrical drum member 68 that forms a cylindrical volume. Drum member 68 has an axis that is parallel with input shaft 18 and is disposed in a plane that is parallel with meeting line 20 with the axis of rotation of input shaft 18. Drum member 68 includes a cylindrical wall portion 70 having opposed parallel edges 72A and 72B, which are parallel with input shaft 18, and further includes a pair of opposed cylindrical end walls 74A and 74B (with end wall 74A being removed in FIG. 5 for purposes of clarity) secured to the curved peripheries of wall portion 70. Drum member is rotatably secured to body 12 by way of connecting axial pins (not shown) between end plate 30A and end wall 74A and between end plate 30B and end wall 74B. Drum member 68 also includes an inner planar wall 76 having first and second edges secured to edges 72A and 72B of wall portion 70. Cylindrical end walls 74A and 74B, inner wall 76, and cylindrical wall portion 70 define a closed volume 82; and cylindrical end walls 74A and 74B, inner wall 76 form an open volume 84 that is opposed to closed volume 82.

In order that drum 68 be flush at end walls 74A and 74B with end plates 30A and 30B, respectively, high and low pressure conduit members 62 and 66 are positioned slightly inwardly from end walls 74A and 74B. Closed volume 82 and open volume 84 comprise the total cylindrical volume formed by drum member 68. Valve seat 24, which is a part of rotary plug valve 22, forms a partially cylindrical surface 84 that is generally parallel with input shaft 18 and drum member 68. Partially cylindrical surface 86 is adapted to rotatably receive drum member 68 at its cylindrical end walls 74A and 74B at open volume 84. An inlet passage 88 is defined at open volume 84 by end walls 74A and 74B, first edge 72 of cylindrical wall portion 70, and surface 86 of valve seat 24. An outlet passage 90 is defined at open volume 84 by end walls 74A and 74B, second edge 80 of inner wall 76, and surface 86 of valve seat 24.

Drum member 68 is rotatable between a fully open position wherein first edge 72A of cylindrical portion 70 is remote from surface 86 of valve seat 24 and inlet passage 88 is fully coextensive with high pressure channel 60 (as shown in FIGS. 6A and 6B), and a fully closed position wherein first edge 72A is coextensive with surface 86 and cylindrical wall portion 70 is fully coextensive with high pressure channel 60 (as shown in FIGS. 9A and 9B). Second edge 72B of cylindrical portion 70 is spaced from surface 86 in both the fully open and fully closed positions.

A hydraulic fluid fills cylindrical chamber 15 including its discharge and suction ports 56 and 58, high pressure channel 60, and low pressure channel 64. The fluid is capable of exerting fluid pressure by way of pressure created by rotor 14 and blades 16 against rotary plug valve 22, specifically against cylindrical wall portion 70 when drum member 68 is in its closed mode or in any of a plurality of intermediate positions between its fully open and fully closed modes. In the fully open position, the fluid passes directly through cylindrical drum member 68 through a closed circuit comprising valve 22, chamber 50, and high and low pressure channels 60 and 66. In the fully closed position, the fluid pressure created by rotor 22 pressurizes valve 22 via pressure on wall portion 70 to cause body 12 to rotate at the same speed as input shaft 18, thus causing output shaft 40 likewise to rotate. This is a one-to-one torque ratio. As valve 22 moves from its open position to its closed position, wall portion 70 is moved across inlet passage 88. FIGS. 6A and 7B through 9A and 9B illustrate this progression as hereinafter described.

FIGS. 6A and 6B illustrate rotary plug valve 22 fully open with inner wall 70, or at 90 degrees relative to a radial line from the axis of input shaft 18 with first edge 72A of cylindrical wall portion 70 aligned with the top wall of high pressure conduit member 62. In this position, rotor 14 turns at the speed of input shaft 18 and blades 16 force the fluid F around the circuit with no pressure being exerted on valve 22 or body 12 so that output shaft 40 does not turn.

FIGS. 7A and 7B illustrate rotary plug valve 22 approximately fifty percent (50%) open with inner wall 70 shown at about a 45 degree angle relative a radial line from the axis of input shaft 18 with first edge 72A spaced from the top wall of high pressure conduit member 62. This is approximately the same alignment as is shown in FIG. 2. In this position, rotor 14 pressurizes about 50 percent of the hydraulic fluid FP against cylindrical wall portion 70 to cause valve 22 and body 12 and therefore output shaft 40 to rotate at about one-half the speed of input shaft 18 with about 50 percent of fluid F being circulated back to the rotor. This is about a 2 to 1 torque ratio, although it is to be understood that exact ratios are not being set forth herein.

FIGS. 8A and 8B illustrate rotary plug valve 22 approxLmately 95 percent closed with inner wall 70 shown at about 85 degrees relative to a radial line from the axis of input shaft 18, with first edge 72A closely spaced from surface 86 of valve seat 24 so that only a small portion of F passes through passage 88. A large portion of fluid creates a fluid pressure FP against cylindrical wall portion 70 so as to cause body 12 and thus output shaft 40 to rotate at almost the same speed at input shaft 18, a ratio slightly greater than one-to-one.

FIGS. 9A and 9B illustrate rotary plug valve 22 fully closed with inner wall 70 shown on a radial line relative to the axis of input shaft 18. First edge 72A is flush with surface 86 of valve seat 24 so that no fluid passes to suction port 58 of chamber 15. This alignment forces all of fluid pressure FP created by rotor 14 against cylindrical wall portion 70 so that body 12 and thus output shaft 40 rotate at the same speed as input shaft 18. This is the one-to-one torque ratio described earlier.

Inner wall 76 forms an inverted "V" extending along the axially aligned length of the wall. As wall 76 moves from the almost closed position shown in FIG. 8A to the closed position shown in FIG. 9A, a small amount of hydraulic fluid is able to squeeze under the V, so that shock to the system is tempered.

The alignment shown in FIGS. 7A and 7B was stated to be about a 2 to 1 torque ratio. It is to be understood that as first edge 78 is moved nearer to the top wall of high pressure conduit member 62, the ratio of speed of input shaft 18 relative to output shaft 46 will increase. Accordingly, a torque ratio of about 5 to 1, or a speed ratio of about 1 to 5 is achievable with the system described.

Rotary plug valve 22 is adjusted to the various positions generally discussed relative to FIGS. 6A and 6B to FIGS. 9A and 9B by motor 92 that is attached to cylindrical mounting plate 46 opposite output shaft 40. A valve control shaft 94 transfers the rotational movements at control output shaft of motor 92 to rotary plug valve 22 so as to rotate the valve in one direction or the other. Motor 92 is preferably a linear reversible electric motor known in the art that can quickly reverse its rotational direction so as to run in either direction. Signals are sent to valve control motor 92 either manually or by suitable electronic controls. It is noted that in the case of internal combustion engines, the speed of both the input and output shafts is controlled, while for one-speed electric motors the torque ratio may be controlled only by way of controlling the speed of the output shaft. Control motor 92 along with control mechanism 94 rotates with body 12 during the operation of system 10.

A pressure relief system 98 for bleeding off excess hydraulic fluid or gases and cooling the bled fluid includes a cylindrical floating collar 100 that is rotatably attached to hub 32 of end plate 30A. Collar 100 is stationary and can be anchored to the frame of a motor car, for example, by a suitable means. Hub 32 rotates relative to collar 100. Suitable bearings (not shown) are disposed between collar 100 and hub 32 to reduce friction between the rotating members. Ring seals 102 are positioned around hub 32. A hydraulic fluid outlet line 104 formed in end plate 30A allows the hydraulic fluid in fluid chamber 15 to pass from the chamber through end plate 30A to hub 32 where the fluid enters a circular channel 108 formed by collar 100 and hub 32 that in turn connects to an outlet line 110 in collar 100 that is rotating about channel 108.

A female connector 112 for outlet line 110 is shown in FIG. 1. A male connector (not shown) capable of attachment to female connector 102 is in turn connected to a tube leading to a hydraulic fluid reservoir (not shown) secured to a base, such as the frame of the motor car, for example, in the area. Similarly, a hydraulic fluid inlet line 114 formed in end plate 30A proximate to outlet line 104 allows hydraulic fluid into fluid chamber 15 to pass from the hydraulic fluid reservoir. An inlet line 116 formed in collar 100 is connected to a female connector 118 adapted to be secured to a male connector to an outlet line from the fluid reservoir. A circular channel 120 proximate to circular channel 108 formed by collar 100 and hub 32 picks up the incoming hydraulic fluid and passes it to inlet line 114. The reservoir, besides allowing gas to escape, also provides cooling capability for the hydraulic fluid. It is also to be noted that movement of rotary plug valve 22 into the hydraulic fluid system during closing operations will also force hydraulic fluid from the system.

Outer ring piece 28 of body 12 is provided with a counterweight 122 at the inner portion of the cylindrical ring that comprises ring piece 28 at a position diametrically opposite valve 22.

Designators of the movements of the body, rotor, and fluid in the system are as follows: In FIGS. 2 and 5 and FIGS. 6A and 6B through 9A and 9B, "FP" refers to fluid pressure and "F" refers to fluid flow; in FIG. 5, "FI" refers to fluid input and "FO" refers to fluid output, "VR" refers to valve rotation, and "BR" refers to body rotation.

The embodiment of the invention particularly disclosed and described above is presented merely as an example of the invention. Other embodiments, forms, and modifications of the invention coming within the proper scope and spirit of the appended claims will, of course, readily suggest themselves to those skilled in the art.

I claim:

1. A fluid continuously variable transmission system, comprising, a combination:

a body forming a chamber, rotor means positioned in said chamber and rotatably movable relative to said body, a power input shaft connected to said rotor means, valve means connected to said body and movable between fully open and fully closed positions and a plurality of intermediate positions therebetween, said valve means comprising a rotary plug valve including a valve seat, said plug valve being rotatably connected to said body, and said valve seat being connected to said body, said body forming high pressure channel means between said chamber and said valve means and low pressure channel means between said valve means and said chamber, said chamber, said high pressure channel, and said low pressure channel being filled with a fluid capable of exerting fluid pressure against said valve means, said valve means being capable of passing said fluid to create a closed fluid circuit with said chamber and said high and low pressure channel means, said rotor means pressuring said fluid from said chamber to said valve means wherein when said valve means is in said fully closed position, said fluid pressure causes said valve means and said body to rotate with the rotational speed of said input shaft; wherein when said valve means is in said fully open position, said fluid passes through said valve means to said chamber and said body is immobile relative to said input shaft and said rotor means; and wherein when said valve means is in any of said intermediate positions, a first portion of said fluid applies pressure against said valve means and a second portion of said fluid passes through said valve means to said chamber, the relation between said first and second fluid portions being proportional to the degree of closing of said valve means, a power output shaft, means for connecting said body with said output shaft;

support means at said input shaft and said output shaft for rotatably supporting said body, and control means connected to said body for adjusting said valve means between said open and closed positions in accordance with torque requirements of said output shaft, wherein the speed of said output shaft can be varied relative to the speed of said input shaft in a plurality of speed ratios between a ratio of one-to-one and a ratio of one and a preselected multiple of one, respectively.

2. A system according to claim 1 wherein said body is generally cylindrical and said valve means is connected to the rim portion of said body.

3. A system according to claim 1 wherein said rotary plug valve includes a drum member having an axis and being rotatably secured to said body at said axis, said drum member forming a cylindrical volume, said axis being generally parallel with said input shaft, said drum member having a cylindrical wall portion having opposed cylindrical end walls and a cylindrical wall portion having opposed axially aligned edges secured to said cylindrical end walls, said drum member further including an inner wall secured to said opposed edges and to said end walls, said end walls, said inner wall, and said cylindrical wall portion defining a closed volume, and said end walls and said inner wall defining an open volume, said closed and open volumes comprising said cylindrical volume; said valve seat having a cylindrical portion generally axially parallel with said input shaft and adapted to rotatably receive said drum member at said end walls; said drum member being adapted to receive fluid pressure at said cylindrical wall portion and to pass said fluid through said open volume across said valve seat.

4. A system according to claim 3, wherein an inlet passage is defined at said open volume by said end walls, said first edge of said inner wall, and said surface of said valve seat; and an outlet passage is defined at said open volume by said end walls, said second edge of said inner wall, and said surface of said valve seat; said drum member being rotatable between said fully open position wherein said first edge of said inner wall is remote from said surface of said valve seat and said inlet passage is fully coextensive with said high pressure channel and said fully closed position wherein said first edge of said inner wall is coextensive with said surface of said valve seat and said cylindrical wall portion is fully coextensive with said high pressure channel, said second edge of said inner wall being spaced from said surface of said valve seat in both said fully open and fully closed positions, wherein said fluid pressure is exerted against said cylindrical wall portion in said fully closed position and in said intermediate positions in relation to the degree of closing of said inlet passage.

5. A system according to claim 4, wherein said input shaft rotates at a constant speed.

6. A system according to claim 4, wherein said input shaft is constructed to rotate at varied speeds, and said control means is adapted to control the speed of said input shaft.

7. A system according to claim 4, further including pressure relief means connected to said high pressure channel for receiving a part of said fluid when said fluid is pressurized beyond the capacity of said fluid circuit to accept said part of said fluid.

* * * * *